July 4, 1967 — H. SCHARFF ETAL — 3,329,070
PRODUCTION OF BAGS FROM THERMOPLASTIC SHEETING
Filed March 20, 1964 — 2 Sheets-Sheet 1

INVENTORS:
HELMUT SCHARFF
HORST ROSEWICZ
BY Margaret Johnston
Cook & Root
ATT'YS July 4, 1967  H. SCHARFF ET AL  3,329,070
PRODUCTION OF BAGS FROM THERMOPLASTIC SHEETING
Filed March 20, 1964  2 Sheets-Sheet 2

INVENTORS:
HELMUT SCHARFF
HORST ROSEWICZ
BY Marjorie Johnston
Hook & Root
ATT'YS

United States Patent Office 3,329,070
Patented July 4, 1967

3,329,070
PRODUCTION OF BAGS FROM THERMO-
PLASTIC SHEETING
Helmut Scharff, Bad Durkheim, and Horst Rosewicz, Ludwigshafen (Rhine), Germany, assignors to Badische Anilin- & Soda-Fabrik Aktiengesellschaft, Ludwigshafen (Rhine), Germany
Filed Mar. 20, 1964, Ser. No. 353,554
Claims priority, application Germany, Mar. 21, 1963, B 71,228
1 Claim. (Cl. 93—35)

This invention relates to a process for the production of bags (including sacks). More specifically, the invention relates to a process for the production of bags from plastics sheeting by welding, the individual parts being only superficially softened during welding.

The use of open flat bags and of valve bags made from plastics for packaging bulk goods is known. Flat bags can be rapidly filled because of their large opening and can be closed rapidly and reliably with a welding machine. When high rates of filling are not required, valve bags are used since these do not require special welding machines.

Valve bags are known having folding valves or sheet valves in flat bag or sidefolding form, the top and bottom seams being closed by welding. Side folding bags require special welding apparatus because the number of plies varies along the welded seam.

Valve bags of the box type having satchel bottoms are also known. In the production of these, a satchel bottom, is made from a tube in a conventional way without loss of material and closed by means of a plastics strip of the same width, which may be either freshly extruded or softened. This method of production has two advantages. During closure, it is not welded seams which are formed but welded areas which in use are loaded in the plane of the joint and not perpendicularly to this plane as in a seam. Furthermore because molten plastic is used as heat carrier, welding dies and oppositely mounted pressure members are not necessary.

It is disadvantageous however that processing melting or molten plastics, for example polyethylene, at the satchel bottom of the bag is difficult. Attempts have therefore been made to fold the bottom in such a way as to form a rectangular shape as in a satchel bottom, but in which closure of the top and bottom is in each case effected by only a single welding which can be carried out easily and continuously. The fact that the closure can be effected simply as compared with closure by extrusion is an advantage, but the high loss of material occasioned by the folding and cutting is a disadvantage.

Methods for the production of plastics bags are also known in which a satchel bottom is prepared and a sheet of paper coated on one side with plastic is laid in the bottom from inside so that the coating faces upwards. During welding, which is carried out with a welding die operating by the heat impulse method, the plies of plastic formed by satchel bottom folding are first welded together and then united with the paper coating, the paper thus insulating the wall of the bag lying underneath so that the welding together of the paper and the wall of the bag is prevented. The use of a pressure member is therefore unnecessary in this case as well.

This method of production also has several disadvantages. For one thing production is made more expensive by the additional use of a sheet of paper, for another the use of a hot welding member contacting the outside faces limits the rate of production because a long period is required to heat up thick-walled sheeting because of the low thermal conductivity of plastics. Consequently welding methods in which heat has to be conducted from the outside to the seam surfaces located on the inside are not efficient enough for processing thick-walled sheeting. Moreover the depth of penetration of heat is not easy to control and necessitates the use of separating layers so that undesirable sticking together of opposed portions of the sheeting is avoided.

The object of the present invention is an improved process for the production of bags of plastics sheeting by which thick sheeting may also be processed.

Another object of the invention is a process for rapid welding of plastics bags in which loss of sheet material as a result of cutting is substantially avoided.

A further object of of the invention is a process for the simultaneous welding of the bottom and valve.

It is in fact the object of the process according to this invention to carry out the welding of the portions of the bottom to be united without effecting complete softening.

In the process according to this invention, a satchel bottom is folded from tubular sheeting and a valve is welded in perpendicularly to the working direction. Then, the walls of the tubular sheeting are partly turned down at the folded edges of the bottom and the surfaces inclined towards each other fused, without complete softening of the sheeting, to an extent corresponding to the size of the weld and in a layer thickness adequate for achieving a reliable joint. Finally the superficially fused joint surfaces are pressed together until they have cooled.

After the bottom has been welded, the valve cut as a tube is inserted prior to the folding of the bottom.

The valve is prepared from portions of different thickness and laid in the bottom and welded therewith so that the thinnner portion faces towards the interior of the bag. The valve, by virtue of its flexibility, should become folded under the pressure of the charge and thus effect a reliable closure.

Apparatus for carrying out the process comprises a housing, a suction means for sucking up the portions of sheeting, a rail cooperating with the suction means for folding over and clamping the portions to be folded, a plate reciprocable in the plane of the bottom for expanding and folding the portions of sheeting, guides adapted to move in the direction of the longitudinal axis of the bag to guide the portions to be welded, spring-mounted rollers movable in the direction of the folds for the production of the folds, and heated wedges movable in the direction of the longitudinal axis of the bag and perpendicularly thereto for fusing the seam surfaces.

The heated wedges are made of metal. They are electrically heated and are movable perpendicularly to the feed direction of the bag. In the process according to this invention for the production of bags the heat is introduced by means of a heat carrier, for example a heated metal wedge, between the surfaces to be welded. It is necessary for the rate of feed of the sheeting and the temperature of the heat carrier to be correlated so that the sheeting is softened for a proportion of the total thickness necessary for achieving a reliable joint and pressure means and also insulation layers are made unnecessary.

The bottom is previously arranged in a conventional manner, for example in the form of a satchel bottom and without loss of material due to cutting, and the valve in the form of a sheet is welded in prior to closure of the bag. This process consisting of a plurality of stages combines the advantages of material-saving production and time-saving welding while avoiding the use of opposed pressure means.

The process according to this invention and the appropriate apparatus will now be described in sequential stages with reference to the accompanying drawings in which.

Figure 4:
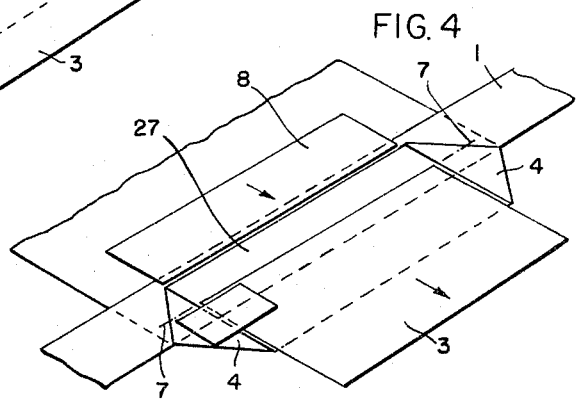
FIGURE 4 shows the introduction of a plate for the production of the fold.

Description of the operations involved:

The raw material for the production of bags is fed in the form of a tube, cut into appropriate lengths and laid on the conveyor belt of the machine which is operated in timed sequence. Each section in turn is clamped by a rail 1 which acts at the same time as a stop for the fold surface 7 (FIGURE 4).

The following operations are illustrated in the drawings and in the description only for one end of the bag but also hold good, apart from the valve, for the other end of the bag.

Figure 1:
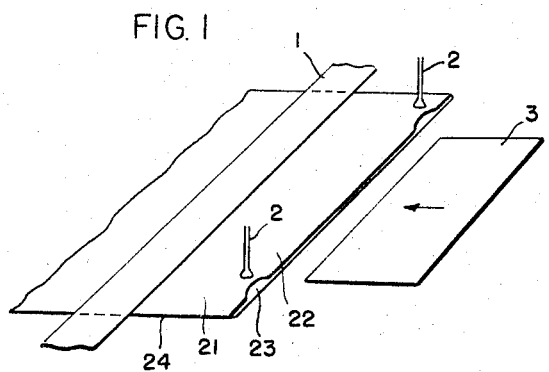
FIGURE 1 shows a section of tubular sheeting at the commencement of welding.
Figure 2:
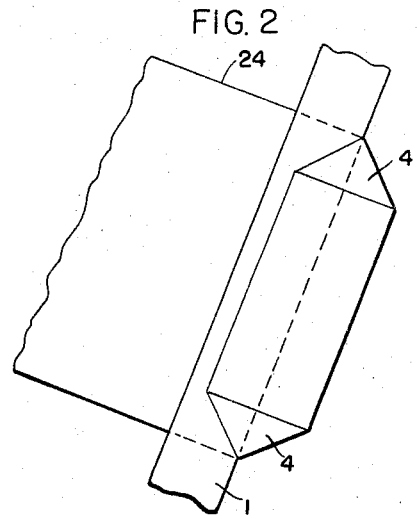
FIGURE 2 shows the folded surfaces of the bottom.

The production of a bag is carried out in the following way:

*First phase.*—The upper side 22 of the tube section 21 lying in advance of the rail 1 is raised somewhat by a suction means 2 (FIGURE 1). A plate 3 is introduced into the opening 23 formed by the suction means 2 in a direction perpendicular to the conveyor belt (not shown) for the purpose of expanding and folding (FIGURE 1). At the begininng of this movement the tube end 21 is further spread out, and during the further movement of the plate 3 the upper side 22 of the tube is forced over the rail 1; at the same time, the triangular fold surfaces 4 are formed at the longitudinal sides 24 of the tube (FIGURE 2).

Figure 3:
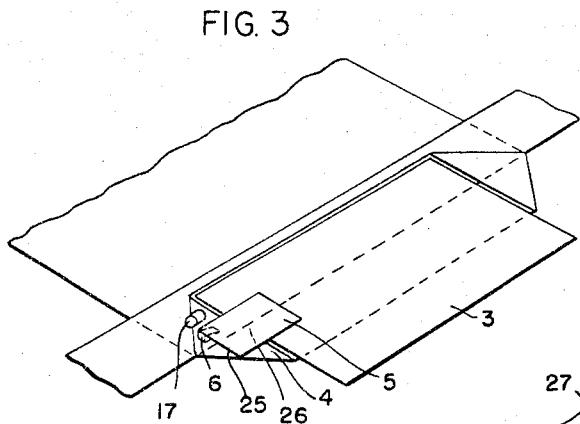
FIGURE 3 shows the introduction of the valve.

At one side of the tube section, also by means of a suction means (not shown), a valve 5 in supplied (FIGURE 3) and conveyed to the point at which it is to be secured. At the same time a welding means is moved along the outer opening 25 of the valve 5 in a direction parallel to the longitudinal axis of the tube section. The lower part of this welding means is a heated welding wedge 6 (FIGURE 3), and the upper part of the welding means is a spring-mounted pressure roller 17. At the roller 17 provided for the valve 5, the welding means is moved to the front so that the two surfaces 4 and 26 to be welded are pressed onto the welding wedge and heated up. The welding means then runs back again and by the following roller 17 (FIGURE 3) the surfaces 4 and 26 are pressed together and welded.

Figure 5:
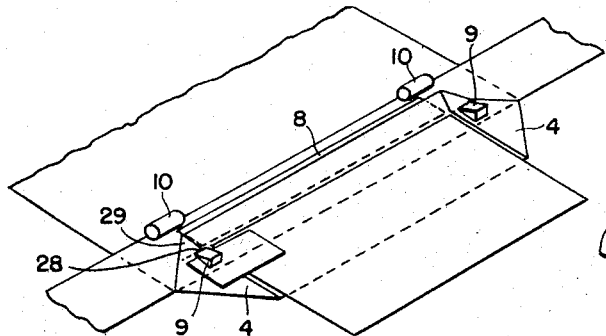
FIGURE 5 shows the introduction of the small heated wedges for welding the two ends of the fold surfaces.
Figure 6:
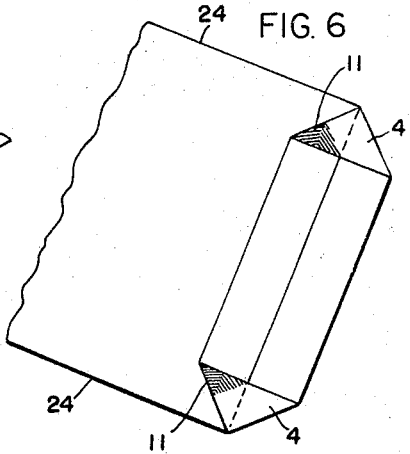
FIGURE 6 shows the fold surfaces to be welded.

At the same time the plate 3 (FIGURE 4) moves back up to the line of the fold 7 to be formed (FIGURE 4) and serves in this position as a stop for the fold 7. Moreover the end of the folded-back upper side 27 of the tube is grasped from the direction of the middle of the bag by the guide 8 and bent upwards. The beginning of the fold 7 is thus formed. Welding wedges 9 (FIGURE 5) are pushed into the fold 7 from the end of the bag so that, viewed in the working direction, the front edge of the welding wedge 9 touches the front corner 29 of the triangle 4 (FIGURE 2) formed by folding. In this position, the welding wedges 9 (FIGURE 5) serve at the same time as stops for the fold 7. Rollers 10 (FIGURE 5) which are sprung downwardly run behind the guide 8 from the direction of the middlle of the bag, bend over the tube material and press it against the welding wedges 9. The surfaces 11 (FIGURE 6) to be welded together have a good heat contact with the welding wedges 9 owing to the pressure of the rollers and are thus heated up and softened. Then the welding wedges 9 are withdrawn and the welded joints in the surfaces 11 (FIGURE 6) are produced by the pressure of the following rollers 10. The partly welded bag is then advanced on the conveyor belt for the second phase, while at the same time a fresh tube section cut to size is brought to the first phase.

Figure 7:
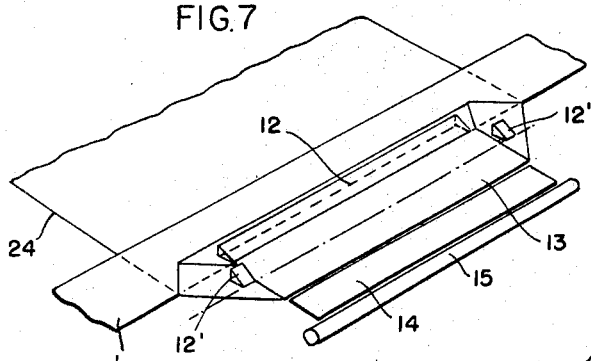
FIGURE 7 shows the bottom prior to the production of the final fold.
Figure 8:
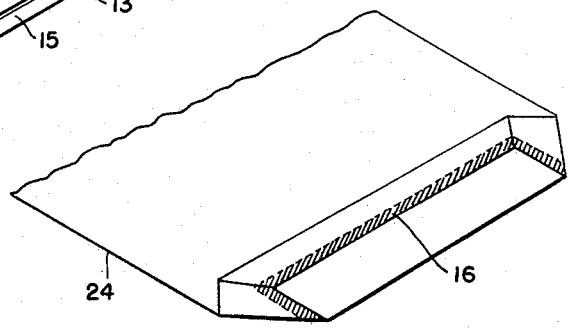
FIGURE 8 shows the final seam sites prior to the final welding of the bottom.

*Second phase.*—A welding wedge 12 (FIGURE 7) shaped to correspond to the second weld surface moves from the middle of the bag in the direction of the end of the bag up to where a fold 13 is to be formed. Again the welding wedge 12 serves at the same time as a stop for the fold 13 (FIGURE 7). At the same time the end of the bag which has not yet been welded is bent over the wedge 12 (FIGURE 7) in the direction of the middle of the bag by a guide 14 (FIGURE 7) and following sprung rollers 15. Intense heat is transmitted on pressing the heated wedge 12 and the external partial wedges 12′ against the joint surfaces 16 (FIGURE 8), which are heated to welding temperature. The welding wedge 12 (FIGURE 7) is then withdrawn in the direction of the middle of the bag. The joint surfaces are pressed together by the rollers 15 following from the end of the bag. The final joint is thus made.

The finished bag is then removed from the conveyor belt.

We claim:

A process for the production of a bag of thermoplastic sheeting provided with a valve, which process comprises:

cutting a length of thermoplastic tubular sheet material and laying said length on a plane surface to flatten said tubular sheet into an upper and lower layer with two longitudinal folds along its opposite sides;

turning up, bending over and folding the upper layer of the flat tubular sheet at an open end thereof along a transverse fold line to form two laterally oppositely disposed triangular portions;

laying flat a valve composed of a short length of tubular sheet material transversely onto one of said triangular portions such that the valve overlaps a centrally located area of said triangular portion;

heating and partly softening the overlapping contacting surfaces of said valve and said triangular portion along at least a strip extending across the width of said valve, and pressing together the resulting softened contacting surfaces of said valve and said triangular portion to form a welded joint;

turning up, bending back over said valve and folding along a transverse fold line the end portion of said upper layer to form two laterally oppositely disposed second smaller triangular portions, one of which is at least partially in overlapping contact with said valve and the other of which is in overlapping contact with a corresponding smaller triangular portion of the underlying sheet material;

heating and partly softening said overlapping contacting surfaces of said smaller triangular portions, said valve and said underlying material, and pressing together the resulting softened contacting surfaces to form a welded joint;

and heating and partly softening a generally U-shaped area along the marginal area around the still-open region at the end of the length of tubular sheet material, turning up, bending over and folding along a transverse fold line the lower layer of said length of tubular sheet material and pressing together the resulting softened U-shaped area to close the end of the length of tubular sheet material.

References Cited

UNITED STATES PATENTS 2,609,734 9/1952 Bardet _____ 93—8
3,237,534 3/1966 Lissner _____ 93—8
3,280,705 10/1966 Gennerich et al. _____ 93—35

BERNARD STICKNEY, *Primary Examiner.*

FRANK E. BAILEY, *Examiner.*

UNITED STATES PATENT OFFICE
CERTIFICATE OF CORRECTION

Patent No. 3,329,070　　　　　　　　　　　July 4, 1967

Helmut Scharff et al.

It is hereby certified that error appears in the above numbered patent requiring correction and that the said Letters Patent should read as corrected below.

Column 3, line 58, for "edge" read -- edge 28 --.

Signed and sealed this 25th day of June 1968.

(SEAL)
Attest:

Edward M. Fletcher, Jr.　　　　　　　　　　　EDWARD J. BRENNER
Attesting Officer　　　　　　　　　　　　　　Commissioner of Patents